(12) United States Patent
Funaya et al.

(10) Patent No.: US 6,885,703 B1
(45) Date of Patent: Apr. 26, 2005

(54) VIDEO CODE PROCESSING METHOD, WHICH CAN GENERATE CONTINUOUS MOVING PICTURES

(75) Inventors: Kouichi Funaya, Tokyo (JP); Osamu Ootsuka, Tokyo (JP)

(73) Assignee: NEC Corporation (JP)

( * ) Notice: Subject to any disclaimer, the term of this patent is extended or adjusted under 35 U.S.C. 154(b) by 916 days.

(21) Appl. No.: 09/693,772

(22) Filed: Oct. 20, 2000

(30) Foreign Application Priority Data

Oct. 22, 1999 (JP) ............................................ 11-301227

(51) Int. Cl.$^7$ .......................... H04N 7/12; H04N 11/04; H04N 11/02
(52) U.S. Cl. ............................ 375/240.12; 375/240.28; 375/240.05; 348/512; 348/529
(58) Field of Search ....................... 325/240.12, 240.26, 325/240.25; 348/404.1, 419.1, 512, 529

(56) References Cited

U.S. PATENT DOCUMENTS 5,835,498 A  * 11/1998 Kim et al. ................... 370/537
6,314,138 B1 * 11/2001 Lemaguet .................... 375/240

FOREIGN PATENT DOCUMENTS

JP          8-37640        2/1996

OTHER PUBLICATIONS

Japanese Office Action issued Dec. 3, 2003 (w/ English translation of relevant portion only).

* cited by examiner

Primary Examiner—Chris Kelley
Assistant Examiner—Charles Parsons
(74) Attorney, Agent, or Firm—Dickstein, Shapiro, Morin & Oshinsky, LLP

(57) ABSTRACT

A video code processing method includes (a), (b), (c) and (d). The (a) step includes providing a first original bit stream including a video code which is a digitized video signal. The (b) step includes generating a second original bit stream at a first timing by delaying the first original bit stream by a specific time interval. The (c) step includes generating a converted bit stream at a second timing. The first original bit stream is code-converted into the converted bit stream. The (d) step includes switching between the second original bit stream and the converted bit stream to output. The specific time interval is adjusted such that the first timing is substantially equal to the second timing.

20 Claims, 5 Drawing Sheets

Fig. 2A  INPUTTED ORIGINAL BIT STREAM A: A1 | A2 | A3 | ...

Fig. 2B  CONVERTED BIT STREAM B OUTPUTTED BY TRANSCODER 1: (delay tp) B1 | B2 | B3 | ...

Fig. 2C  ORIGINAL BIT STREAM A OUTPUTTED BY BUFFER 2: (delay tp) A1 | A2 | A3 | ...

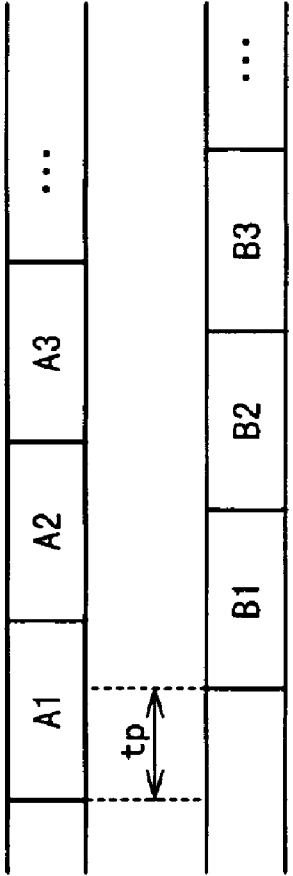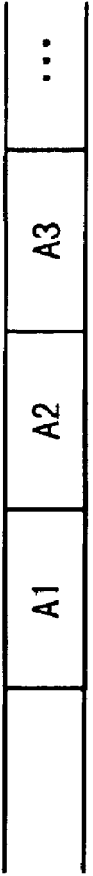
Fig. 4A INPUTTED ORIGINAL BIT STREAM A
Fig. 4B CONVERTED BIT STREAM B OUTPUTTED BY TRANSCODER 11
Fig. 4C BUFFER CONTROLLER 14
Fig. 4D ORIGINAL BIT STREAM A OUTPUTTED BY BUFFER 12

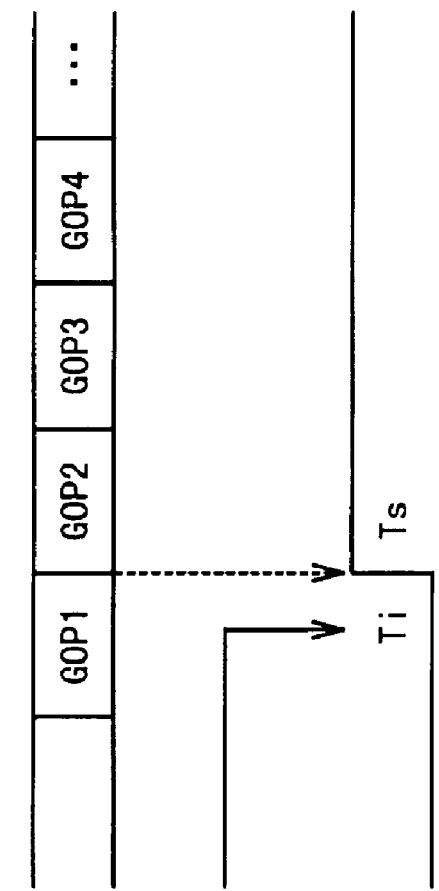

VIDEO CODE PROCESSING METHOD, WHICH CAN GENERATE CONTINUOUS MOVING PICTURES

BACKGROUND OF THE INVENTION

1. Field of the Invention

The present invention relates to a method and apparatus for processing a video code, which can receive, as a original bit stream, a bit stream constituted by a video code, which is a digitized video signal, and then output any one of the original bit stream and a converted bit stream into which the original bit stream is code-converted. More particularly, the present invention relates to a method and apparatus for processing a video code, which can switch smoothly without disturbing a decoded picture when switching between the original bit stream and the converted bit stream.

2. Description of the Related Art

Conventionally, in this method for processing a video code, when a picture data serving as a video signal is encoded to generate a bit stream, a transcoding for converting a rate of the bit stream into a lower rate is carried out in order to reduce a band of a transmission path or a memory capacity.

For example, in a case of a standard type MPEG2 to compress or expand a color moving picture, a bit stream is transmitted as a transport stream from a transmission side through an antenna or a network to a reception side. If a band of the antenna or the network is low, the transmission side converts the transport stream into another transport stream of a lower rate. That is, the transmission is done after the execution of the transcoding.

When the reception side records the transport stream, there may be the limitations, such as an upper limit of a bit rate caused by a recorder or a record medium, an upper limit of a capacity and the like. The performance as a memory capacity of a recorder can be improved if the transport stream is converted into the transport stream of the lower rate when it is recorded, namely, if it is recorded after the execution of the transcoding.

Although there may be various methods for the transcoding, it can be attained by a combination of a decoder and an encoder as a simple method. In short, a bit stream is inputted to the decoder, and completely decoded. An output picture data is inputted to the encoder to then generate and output a bit stream of a desirable rate. However, this method carries out the processes for decoding and encoding the bit stream. Thus, the output bit stream is more delayed than the input bit stream by a time necessary for the respective decoding and encoding processes.

For example, in a case of a compression method using a correlation between frames such as the MPEG2, a time delay is induced because of a rearrangement of the frames. That is, a bidirectionally predictive encode picture (B picture) is accumulated in the bit stream in an order different from a picture display order. In a case of a typical MPEG2 stream of [M=3], when the decoding process is done, it brings about a delay corresponding to three frames. Moreover, even when the encoding process is done, it brings about a delay corresponding to three frames since it waits for an intra encode picture (I-picture) and a predictive encode picture (P-picture).

That is, the bit stream on which the transcoding is performed has the delay corresponding to six frames with respect to the input original bit stream. For this reason, the simply switching operation between the original bit stream and the bit stream on which the transcoding is performed causes the moving picture to be discontinuous. Switching between them by omitting the rearrangement of the frames so as not to bring about the time delay results in the disturbance of a screen since the decoding and encoding processes are not carried out normally.

Here, the method for perfectly decoding by using the decoder has been already described as the method for the transcoding. However, as another attaining method, for example, even a method for decoding up to a DCT (Discrete Cosine Transformation) area and again encoding and the like bring about the situation similar to the above-mentioned situation since the bit stream on which the transcoding is performed has the delay with respect to the original bit stream.

Conventionally, there are the proposals of the techniques with regard to a buffer control and a rate control of a bit stream itself on which the transcoding is performed. However, there is no information corresponding to a control with regard to a time difference between the original bit stream and the bit stream on which the transcoding is performed.

The above-mentioned conventional method and system for processing the video code have the problem that they can not generate the continuous moving pictures when switching from the bit stream on which the transcoding is performed to the original bit stream, or from the original bit stream to the bit stream on which the transcoding is performed, in the course of the bit stream.

This is because the bit stream on which the transcoding is performed has the delay corresponding to the time necessary for the transcoding process as compared with the original bit stream. Also, this is because the simply switching operation can not be done because of the difference of the bit stream structure caused by the encoding structure.

SUMMARY OF THE INVENTION

The present invention is accomplished in view of the above mentioned problems. Therefore, an object of the present invention is to provide a method and system for processing a video code, which can generate continuous moving pictures even when switching from a bit stream on which a transcoding is performed to an original bit stream, or from the original bit stream to the bit stream on which the transcoding is performed, in a course of the bit streams.

In order to achieve an aspect of the present invention, a video code processing method, includes: (a) providing a first original bit stream including a video code which is a digitized video signal; (b) generating a second original bit stream at a first timing by delaying the first original bit stream by a specific time interval; (c) generating a converted bit stream at a second timing, the first original bit stream being code-converted into the converted bit stream; and (d) switching between the second original bit stream and the converted bit stream to output, and wherein the specific time interval is adjusted such that the first timing is substantially equal to the second timing.

In this case, the specific time interval is adjusted such that continuous moving pictures corresponding to the first original bit stream can be obtained even when the (d) is performed in a course of the second original bit stream and the converted bit stream.

Also in this case, each of the second original bit stream and the converted bit stream has a plurality of frames, and wherein the (d) includes switching between the second original bit stream and the converted bit stream at a switching point corresponding to a start position or end position of one of the plurality of frames of the second original bit stream and the converted bit stream.

Further in this case, the first timing is determined by monitoring the second timing and controlling the specific time interval based on the monitoring result.

In this case, the first timing is determined by monitoring the first and second timings and controlling the specific time interval based on the monitoring result.

Also in this case, the first timing is determined by monitoring the first and second timings and performing feedback control on the specific time interval such that a difference between the first and second timings is reduced based on the monitoring result.

Further in this case, the (d) includes switching between the second original bit stream and the converted bit stream at a switching point detected in accordance with a bit stream structure of an encoded picture of the first original bit stream.

In this case, the switching point is detected in accordance with a bit stream structure of an encoded picture of the first original bit stream such that continuous moving pictures corresponding to the first original bit stream can be obtained without a disturbance in the continuous moving pictures.

Also in this case, a video code processing method, further includes: (f) inputting a switch command at a third timing, and wherein each of the second original bit stream and the converted bit stream corresponds to MPEG (Moving Picture Experts Group) 2 type and has a plurality of GOPs (Group of Picture), each of the plurality of GOPs including an Intra-Picture (I Picture), a Predictive-Picture (P picture) and a Bidirectionally predictive-Picture (B picture), and wherein the (d) includes switching between the second original bit stream and the converted bit stream at a switching point corresponding to a lead position of one of the plurality of GOPs which is on the third timing or the closest to the third timing after the third timing.

In order to achieve another aspect of the present invention, a video code processing apparatus, includes: a buffer section inputting a first original bit stream including a video code which is a digitized video signal to generate a second original bit stream at a first timing by delaying the first original bit stream by a specific time interval; a transcoding section generating a converted bit stream at a second timing, the first original bit stream being code-converted into the converted bit stream; and a switching section switching between the second original bit stream and the converted bit stream to output, and wherein the specific time interval is adjusted such that the first timing is substantially equal to the second timing.

In this case, the specific time interval is adjusted such that continuous moving pictures corresponding to the first original bit stream can be obtained even when the switching section switches between the second original bit stream and the converted bit stream in a course of the second original bit stream and the converted bit stream.

Also in this case, each of the second original bit stream and the converted bit stream has a plurality of frames, and wherein the switching section switches between the second original bit stream and the converted bit stream at a switching point corresponding to a start position or end position of one of the plurality of frames of the second original bit stream and the converted bit stream.

Further in this case, a video code processing apparatus, further includes: a buffer controlling section monitoring the second timing to control the specific time interval based on the monitoring result.

In this case, a video code processing apparatus, further includes: a buffer controlling section monitoring the first and second timings to control the specific time interval based on the monitoring result.

Also in this case, a video code processing apparatus, further includes: a buffer controlling section monitoring the first and second timings to perform feedback control on the specific time interval such that a difference between the first and second timings is reduced based on the monitoring result.

Further in this case, the switching section switches between the second original bit stream and the converted bit stream at a switching point detected in accordance with a bit stream structure of an encoded picture of the first original bit stream.

In this case, a video code processing apparatus, further includes: a switch controlling section inputting a switch command at a third timing to determine a switching point at which the switching section switches between the second original bit stream and the converted bit stream, and wherein each of the second original bit stream and the converted bit stream corresponds to MPEG (Moving Picture Experts Group) 2 type and has a plurality of GOPs (Group of Picture), each of the plurality of GOPs including an Intra-Picture (I Picture), a Predictive-Picture (P picture) and a Bidirectionally predictive-Picture (B picture), and wherein the switch controlling section determines the switching point such that the switching point corresponds to a lead position of one of the plurality of GOPs which is on the third timing or the closest to the third timing after the third timing.

Also in this case, the buffer section and the transcoding section and the switching section are included in a single unit.

Further in this case, the buffer section and the transcoding section and the switching section and the buffer controlling section are included in a single unit.

In this case, the buffer section and the transcoding section and the switching section and the buffer controlling section and the switch controlling section are included in a single unit.

It is possible to output an encoded data in which screens of moving pictures are coincident since such a device tentatively holds therein an input original bit stream and then makes a timing of the input original bit stream coincide with a timing of an output of a bit stream on which a transcoding is performed.

Moreover, since a switching controller is included, it is possible to accurately treat an encoded data corresponding to the same screen of a moving picture even for a bit stream structure of a different kind of an encode picture.

BRIEF DESCRIPTION OF THE DRAWINGS

FIG. 2A is a timing chart showing a original bit stream inputted to a transcoder of FIG. 1;

FIG. 2B is a timing chart showing a converted bit stream outputted by the transcoder of FIG. 1;

FIG. 2C is a timing chart showing a original bit stream outputted by a buffer of FIG. 1;

FIG. 4A is a timing chart showing a original bit stream inputted to a transcoder of FIG. 3;

FIG. 4B is a timing chart showing a converted bit stream outputted by the transcoder of FIG. 3;

FIG. 4C is a timing chart showing a command outputted by a buffer controller of FIG. 3;

FIG. 4D is a timing chart showing a original bit stream outputted by the buffer of FIG. 3;

FIG. 5A is a timing chart showing a raw or converted bit stream of FIG. 3;

FIG. 5B is a timing chart showing a switch command inputted to the switch controller of FIG. 3; and FIG. 5C is a timing chart showing a switch command outputted by the switch controller of FIG. 3.

DESCRIPTION OF THE PREFERRED EMBODIMENTS

An embodiment of the present invention will be described below with reference to the attached drawings.

Figure 1:
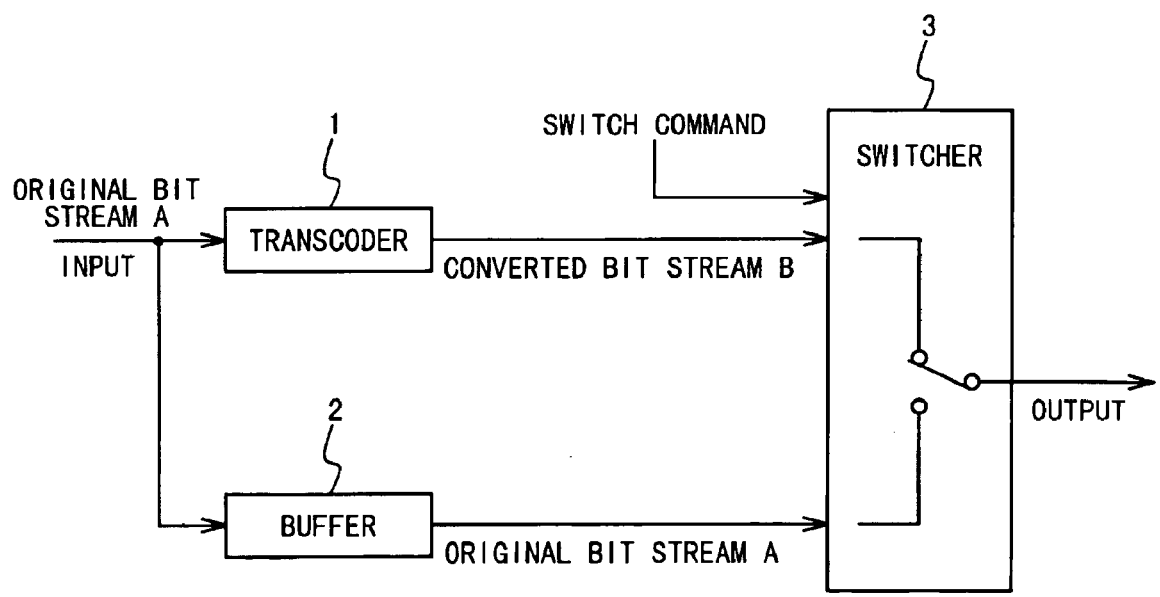
FIG. 1 is a function block diagram showing an embodiment of the present invention.

FIG. 1 is a function block diagram showing an embodiment of the present invention. It is provided with a transcoder 1 and a buffer 2 for receiving a original bit stream to be inputted, and a switcher 3 for switching any one of outputs of the transcoder 1 and the buffer 2 and then connecting it to an external portion.

FIG. 1 is different from the conventional system for processing a video code, in a fact that the buffer 2 is mounted.

The transcoder 1 inputs the original bit stream A to convert into a converted bit stream B of a low rate, and outputs to the switcher 3. The buffer 2 inputs the original bit stream A to hold therein only for a period of the conversion in the transcoder 1, and outputs to the switcher 3. The switcher 3 switches between the converted bit stream B outputted by the transcoder 1 and the original bit stream A outputted by the buffer 2, based on a switch command from the external portion, and outputs any one of the bit streams A, B to the external portion.

The operations of the function block in FIG. 1 will be described below with reference to FIGS. 1 and 2A to 2C. FIG. 2A is a timing chart showing the original bit stream A inputted to the transcoder 1. FIG. 2B is a timing chart showing the converted bit stream B outputted by the transcoder 1. And, FIG. 2C is a timing chart showing the original bit stream A outputted by the buffer 2.

The converted bit stream B outputted by the transcoder 1 has a delay corresponding to a process time tp in the transcoder 1, as compared with the original bit stream A inputted to the transcoder 1, as shown in FIGS. 2A and 2B.

As shown in FIGS. 2A and 2C, the buffer 2 holds therein the original bit stream A inputted to the transcoder 1 only for the process time tp, and outputs it. Thus, in input sections of the switcher 3, respective frame positions of the converted bit stream B outputted by the transcoder 1 and the original bit stream A outputted by the buffer 2 are in temporal coincidence with each other. The switcher 3 switches between the two input signals, namely, between the converted bit stream B on which the transcoding is performed and the original bit stream A outputted by the buffer 2, at a point such as a frame start or a frame end. As a result, it is possible to switch between the encode data without a disturbance in a moving picture.

Figure 3:
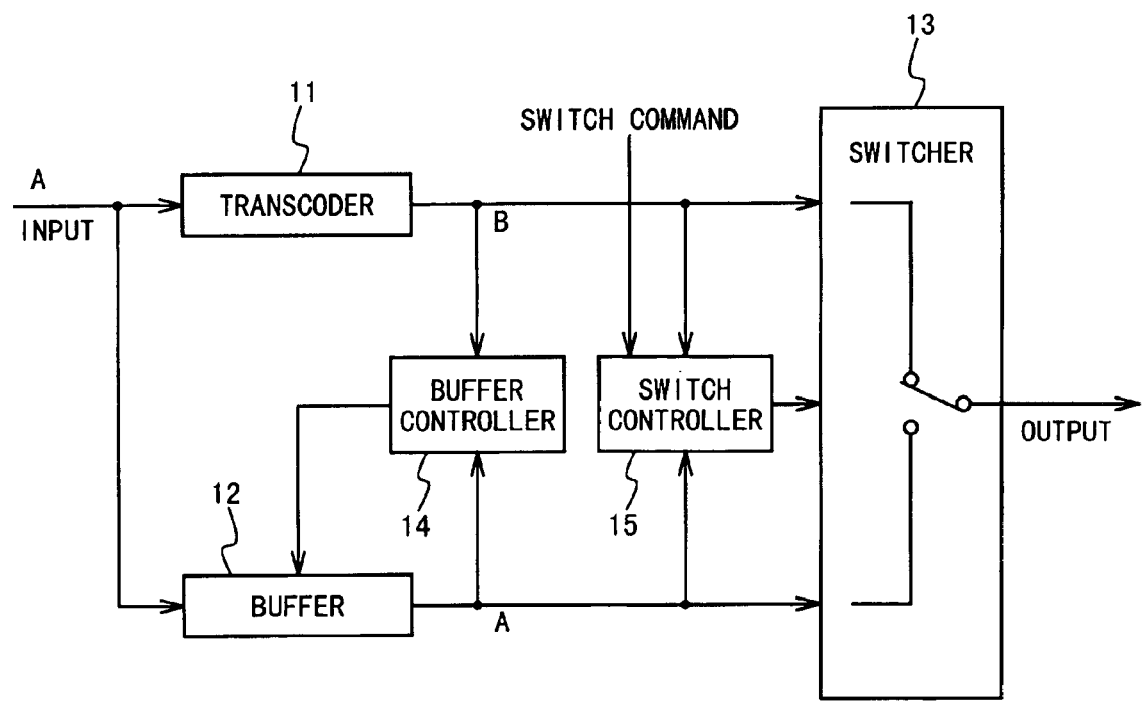
FIG. 3 is a function block diagram showing an embodiment of the present invention, differently from FIG. 1.

An embodiment different from that of FIG. 1 will be described below with reference to FIG. 3. In FIG. 3, a system is provided with a transcoder 11, a buffer 12, a switcher 13, a buffer controller 14 and a switch controller 15.

FIG. 3 is different from FIG. 1 in a fact that the buffer controller 14 for controlling the buffer 12 and the switch controller 15 for controlling the switcher 13 are added.

The transcoder 11 has the function equal to the conventional function of converting the original bit stream A into the converted bit stream B of the low rate. The transcoder 11 outputs the converted bit stream B to the switcher 13, the buffer controller 14 and the switch controller 15.

The buffer 12 tentatively holds therein the original bit stream A under the control of the buffer controller 14, and outputs to the switcher 13, the buffer controller 14 and the switch controller 15.

The switcher 13 receives the converted bit stream B outputted by the transcoder 11 and the original bit stream A outputted by the buffer 12, switches between the converted bit stream B and the original bit stream A, at a switch point between the frames, under the control of the switch controller 15, and outputs any one of the bit streams A, B to an external portion.

The buffer controller 14 receives the converted bit stream B from the transcoder 11 and the original bit stream A from the buffer 12. Based on the input signals A, B, the buffer controller 14 controls the buffer 12 so that the original bit stream A outputted by the buffer 12 is temporally equal to the converted bit stream B outputted by the transcoder 11 at the switch point between the frames.

The switch controller 15 receives the converted bit stream B outputted by the transcoder 11 or the original bit stream A outputted by the buffer 12, and controls the switcher 13 so as to switch at a timing suitable for the bit stream structure, based on a switch command inputted from the external portion.

The operations of the buffer controller 14 in FIG. 3 will be described below with reference to FIG. 3 and FIGS. 4A to 4D.

The converted bit stream B outputted by the transcoder 11 has a delay corresponding to a process time tp in the transcoder 11, as compared with the original bit stream A inputted to the transcoder 11, as shown in FIGS. 4A and 4B. The buffer 12 tentatively holds therein the original bit stream A, to output it, based on a command of the buffer controller 14 as shown in FIGS. 4C and 4D.

As shown in FIGS. 4B to 4D, the buffer controller 14 performs a control of holding and outputting the bit stream, on the buffer 12 so that the converted bit stream B outputted by the transcoder 11 is temporally equal to the original bit stream A outputted by the buffer 12. For example, the buffer controller 14 compares the original bit stream A outputted by the buffer 12 with the converted bit stream B outputted by the transcoder 11, and performs a feedback control on the buffer 12 so as to reduce a difference at a switch point between the frames to a small value, based on the comparison result.

The operations of the switch controller 15 in FIG. 3 will be described below with reference to FIG. 3 and FIGS. 5A and 5B.

The switch controller 15 controls the switcher 13 so that the bit streams A, B are switched at an optimal timing. As the switch timing used in the switch controller 15, for example, when the bit streams corresponds to the MPEG2, it is possible to use a unit of a group of pictures (GOP) composed of an intra encode picture (I-picture), an predictive encode picture (P-picture) and a bidirectionally predictive encode picture (B-picture) (refer to FIG. 5A).

FIG. 5A is a timing chart showing the converted bit stream B or the original bit stream A outputted by the buffer 12 which is received by the switch controller 15. Since the switch controller 15 receives the original bit stream A outputted by the buffer 12, an input timing of the original bit stream A is equal to that of the converted bit stream B. As mentioned above, the two timings of the bit streams A, B received by the switch controller 15 are equal to each other.

So, from the viewpoint that it may be any timing of the two bit streams A, B, FIG. 5A shows the timing of the original bit stream A or the converted bit stream B.

As shown in FIGS. 5B and 5C, let us suppose that the switch controller 15 receives the switch command of the transcoding from a user or the system at a point Ti. The switch controller 15 detects a lead point Ts of a first GOP (refer to FIG. 5C) on and after the point Ti of FIG. 5B, in the original bit stream A outputted by the buffer 12 or the converted bit stream B on which the transcoding is performed as shown in FIG. 5A. Then, the switch controller 15 instructs the switcher 13 to carry out the switching operation at the lead point Ts.

The switcher 13 will be described below by referring back to FIG. 3.

The switcher 13 switches to any one of the two input signals, namely, any one of the converted bit stream B on which the transcoding is performed and the original bit stream A outputted by the buffer 12, and connects it to an external output. In the MPEG2, all encoded pictures can be decoded for each the GOP. Thus, any disturbance in the decoded pictures is never induced before and after the switching operation.

As mentioned above, the shortest switch point within the frame is selected for each of the bit stream structures of different kinds of encoded pictures. Thus, it is possible to accurately treat the encoded data corresponding to the same screen of the dynamic image in the shortest time, for the switch command (the switch command received at the point Ti in the above-mentioned example) from the external portion. Hence, even in any of the bit stream structures, it is possible to switch between the original bit stream A and the converted bit stream B without the disturbance in the picture in the shortest time, for the switch command from the external portion.

Also, in the above-mentioned case, the buffer 12 and the switcher 13 are explained as respective single members (units). However, instead of the configuration, the transcoder 11 can contain therein the buffer function of the buffer 12 and the switch function of the switcher 13.

Here, the transcoder 11 containing therein the buffer function tentatively holds therein the original bit stream A until the original bit stream A is code-converted into the converted bit stream B, and then outputs the original bit stream A at the same timing as the output timing of the converted bit stream B.

Here, the transcoder 11 containing therein the switch function switches between the converted bit stream B and the original bit stream A having the same timing through the buffer function, based on the switch command from the external portion, and then outputs to the external portion.

The transcoder 11 containing therein the buffer function and the switch function as mentioned above can further contain therein the buffer control function of the buffer controller 14 as mentioned above. The transcoder 11 containing therein the buffer control function to make the output timings of both the bit streams B, A coincide with each other, based on the converted bit stream B and the original bit stream A outputted by the buffer function, and accordingly controls the tentatively held amount of the original bit stream A.

The transcoder 11 containing therein the buffer function, the switch function and the buffer control function as mentioned above can further contain therein the switch control function of the switch controller 15 as mentioned above. The transcoder 11 containing therein the switch control function detects the switch timing corresponding to the bit stream structure of any one encoded picture of both the bit streams B, A, based on the converted bit stream B and the original bit stream A outputted by the buffer function. After that, the transcoder 11, when receiving the switch command from the external portion, makes it coincide with the switch timing, and instructs the switch function, and then outputs any one of the converted bit stream B and the original bit stream A outputted by the buffer function.

In the above-mentioned explanation, the timing adjustment in the buffer is done at the frame unit, and the point of the switch control is defined as the GOP unit. However, another suitable unit may be selected depending on the configuration of the bit stream.

Also, the function blocks are illustrated and described. However, it is free to separate or merge the functions as long as the separation or the merger satisfies the above-mentioned functions. The above-mentioned explanations do not limit the present invention.

As mentioned above, the present invention can obtain the following effects.

The first effect lies in the fact that the continuous dynamic images can be generated even when switching from the bit stream on which the transcoding is performed to the original bit stream, in the course of the bit streams, or switching from the original bit stream to the bit stream on which the transcoding is performed in the course of the bit streams.

This is because it is possible to output the original bit stream at the same timing as the bit stream on which the transcoding is performed, by mounting the buffer function in the original bit stream to be inputted. As a result, the encoded data of the same dynamic image can be connected to the external output, even in any of the original bit stream and the bit stream on which the transcoding is performed.

The second effect lies in the fact that even in any of the bit stream structures, the switching operation can be done without the disturbance in the picture, in the shortest time, for the switch command from the external portion.

This is because it is possible to switch between the bit streams by selecting the optimal switch point from the bit stream structures based on the switch control function.

What is claimed is:

1. A video code processing method, comprising:
   (a) providing a first original bit stream including a video code which is a digitized video signal;
   (b) generating a second original bit stream at a first timing by delaying said first original bit stream by a specific time interval;
   (c) generating a converted bit stream at a second timing, said first original bit stream being code-converted into said converting bit stream; and
   (d) switching between said second original bit stream and said converted bit stream to output;
   (e) monitoring said second signal in bit stream and said converted bit stream; and
   (f) generating a delay control signal response to the monitoring,
   wherein said specific time interval is adjusted by said delay control signal such that said first timing is substantially equal to said second timing.

2. A video code processing method according to claim 1, wherein said specific time interval is adjusted such that continuous moving pictures corresponding to said first original bit stream can be obtained even when said step (d) is performed in a course of said second original bit stream and said converted bit stream.

3. A video code processing method according to claim 1, wherein each of said second original bit stream and said converted bit stream has a plurality of frames, and
   wherein said step (d) includes switching between said second original bit stream and said converted bit stream at a switching point corresponding to a start position or end position of one of said plurality of frames of said second original bit stream and said converted bit stream.

4. A video code processing method according to claim 1, wherein said first timing is determined by monitoring said second timing and controlling said specific time interval based on the monitoring result.

5. A video code processing method according to claim 1, wherein said first timing is determined by monitoring said first and second timings and controlling said specific time interval based on the monitoring result.

6. A video code processing method according to claim 5, wherein said first timing is determined by monitoring said first and second timings and performing feedback control on said specific time interval such that a difference between said first and second timings is reduced based on the monitoring result.

7. A video code processing method according to claim 1, wherein said step (d) includes switching between said second original bit stream and said converted bit stream at a switching point detected in accordance with a bit stream structure of an encoded picture of said first original bit stream.

8. A video code processing method according to claim 7, wherein said switching point is detected in accordance with a bit stream structure of an encoded picture of said first original bit stream such that continuous moving pictures corresponding to said first bit stream can be obtained without a disturbance in said continuous moving pictures.

9. A video code processing method according to claim 1, further comprising:
   (g) inputting a switch command at a third timing, and
   wherein each of said second original bit stream and said converted bit stream corresponds to MPEG (Moving Picture Experts Group) 2 type and has a plurality of GOPs (Group of Pictures), each of said plurality of GOPs including an Intra-Picture (I Picture), a Predictive-Picture (P picture) and a Bidirectionally predictive-Picture (B picture), and
   wherein said step (d) includes switching between said second original bit stream and said converted bit stream at a switching point corresponding to a lead position of one of said plurality of GOPs which is on said third timing or the closest to said third timing after said third timing.

10. A video code processing apparatus, comprising;
    a buffer section inputting a first original bit stream including a video code which is a digitized video signal to generate a second original bit stream at a first timing by delaying said first original bit stream by a specific time interval;
    a transcoding section generating a converted bit stream at a second timing, said first original bit stream being code-converted into said converted bit stream; and
    a switching second switching between said second original bit stream and said converted bit stream to output; and
    a buffer controlling section that receives as inputs said second original bit stream and said converted bit stream and outputs a buffer control signal,
    wherein said specific time interval is adjusted by said buffer controller signal such that said first timing is substantially equal to said second timing.

11. A video code processing apparatus according to claim 10, wherein said specific time interval is adjusted such that continuous moving pictures corresponding to said first original bit stream can be obtained even when said switching section switches between said second original bit stream and said converted bit stream in a course of said second original bit stream and said converted bit stream.

12. A video code processing apparatus according to claim 11, wherein each of said second original bit stream and said converted bit stream has a plurality of frames, and
    wherein said switching section switches between said second original bit stream and said converted bit stream at a switching point corresponding to a start position or end position of one of said plurality of frames of said second original bit stream and said converted bit stream.

13. A video code processing apparatus according to claim 10, wherein said
    buffer controlling section monitoring said second timing to control said specific time interval based on the monitoring result.

14. A video code processing apparatus according to claim 10, further comprising:
    a buffer controlling section monitoring said first and second timings to control said specific time interval based on the monitoring result.

15. A video code processing apparatus according to claim 10, further comprising:
    a buffer controlling section monitoring said first and second timings to perform feedback control on said specific time interval such that a difference between said first and second timings is reduced based on the monitoring result.

16. A video code processing apparatus according to claim 10, wherein said switching section switches between said second original bit stream and said converted bit stream at a switching point detected in accordance with a bit stream structure of an encoded picture of said first original bit stream.

17. A video code processing method according to claim 10, further comprising:
    a switch controlling section inputting a switch command at a third timing to determine a switching point at which said switching section switches between said second original bit stream and said converted bit stream, and
    wherein each of said second original bit stream and said converted bit stream corresponds to MPEG (Moving Picture Experts Group) 2 type and has a plurality of GOPs (Group of Pictures), each of said plurality of GOPs including an Intra-Picture (I Picture), a Predictive-Picture (P picture) and a Bidirectionally predictive-Picture (B picture), and
    wherein said switch controlling section determines said switching point such that said switching point corresponds to a lead position of one of said plurality of GOPs which is on said third timing or the closest to said third timing after said third timing.

18. A video code processing apparatus according to claim 10, wherein said buffer section and said transcoding section and said switching section are included in a single unit.

19. A video code processing apparatus according to claim 13, wherein said buffer section and said transcoding section and said switching section and said buffer controlling section are included in a single unit.

20. A video code processing apparatus according to claim 17, wherein said buffer section and said transcoding section and said switching section and said buffer controlling section and said switch controlling section are included in a single unit.

* * * * *